United States Patent [19]
Nickolson et al.

[11] 3,875,195
[45] Apr. 1, 1975

[54] REDUCTION OF 3-KETO-5 BETA-H STEROIDS TO 3 BETA-HYDROXY-5BETA-H STEROIDS

[75] Inventors: Robert C. Nickolson, Ulrich Kerb; Rudolf Wiechert, Berlin, both of Germany

[73] Assignee: Schering Aktiengesellschaft, Berlin and Bergkamen, Germany

[22] Filed: Nov. 15, 1973

[21] Appl. No.: 416,095

[30] Foreign Application Priority Data
Nov. 18, 1972 Germany............................ 2257132

[52] U.S. Cl..... 260/397.4, 260/397.45, 260/397.47, 260/397.5
[51] Int. Cl.................... C07c 169/20, C07c 169/32

[58] Field of Search....../Machine Searched Steroids

[56] References Cited
OTHER PUBLICATIONS
Barton et al., Chem. Soc. Jour., p. 1027–1040, (1953).
Kirk et al., Steroid Reaction Mechanisms, p. 143–145, (1968).

Primary Examiner—Henry A. French
Attorney, Agent, or Firm—Millen, Raptes & White

[57] ABSTRACT

3-keto-5$\beta$-H steroids are reduced to 3$\beta$-hydroxy-5$\beta$-H steroids with hydrogen under pressure and Raney nickel catalyst in a lower carboxylic acid as solvent.

6 Claims, No Drawings

REDUCTION OF 3-KETO-5 BETA-H STEROIDS TO 3 BETA-HYDROXY-5 BETA-H STEROIDS

BACKGROUND OF THE INVENTION

This invention relates to a process for the production of 3β-hydroxy-5β-H steroids.

The reduction of A/B-cis-linked 3-keto steroids with complex metal hydrides, such as, for example, lithium aluminum hydride or sodium borohydride, results predominantly in the equatorial 3α-hydroxy steroids, which can subsequently be epimerized to the 3β-hydroxy compounds via the intermediate stage of the 3-tosylate (Ann. 721 (1969), 168; Helv. 43 (1960), 338).

The use of the Meerwein-Ponndorf method for the reduction of such 5β-3-keto steroids leads to mixtures of 3α- and 3β-hydroxy steroids in equal portions. The separation of these products is difficult (German Pat. No. 1,927,109).

Although corresponding 3β-hydroxy steroids are obtained by reducing the 5β-3-keto steroids with iridium (IV) chloride and trialkyl phosphite in boiling isopropanol, inordinately long reaction times, e.g., 10 days, are required (J. Chem. Soc. 1969, 1653).

If the starting steroids contain 20β-hydroxy groups, D-homo steroids are partially obtained according to this latter prior art process. A 20-ketopregnane side chain is, in part, epimerized to the 17α-side chain. An intermediary blocking of the 20-keto group by ketalization is impossible, since the ketal group is split off under these reaction conditions.

All of these methods for the preparation of 3β-hydroxy-5β-H steroids from 5β-3-keto steroids have the disadvantage that they provide only very low yields, since they are neither selective nor stereospecific.

The use of the process for producing $\Delta^{5(10)}$— unsaturated 3β-hydroxy steroids from $\Delta^{5(10)}$-3-keto steroids by reduction with Raney nickel, with and without the use of pressure, in accordance with German Unexamined Applications DOS 1,643,048 and DOS 1,914,898, for the production of 3β-hydroxy-5β-H steroids from the corresponding 5β-3-keto steroids does not lead to the desired objective, even with the use of pressure in the indicated solvents, e.g., tetrahydrofuran. The desired 3β-hydroxy-5β-H steroids are obtained in only small yield.

This invention is directed to the problem of providing a selective and stereospecific process for the preparation of 3β-hydroxy-5β-steroids from 5β-3-keto steroids.

SUMMARY OF THE INVENTION

According to this invention, 3-keto-5β-H steroids are reduced to 3β-hydroxy-5β-H steroids in a lower carboxylic acid with Raney nickel and hydrogen under pressure.

DETAILED DISCUSSION

In carrying out the process of this invention, a Raney nickel catalyst is employed, which can be prepared in the usual manner from alloys of nickel and aluminum (50:50) by introduction into a strong base. The catalyst produced in this way has a rather long shelf life, if stored under certain precautionary measures, such as always moistened with methanol and being at a temperature of below 10°C, without the catalytic activity being altered.

Since the reduction is conducted at elevated pressure, it is conducted in the presence of an amount of hydrogen in substantial excess of the amount required to reduce the 3-keto group. C-11,C-17 and/or C-20 keto groups are not reduced under these reaction conditions.

The reduction with Raney nickel is conducted in a lower carboxylic acid as solvent, i.e., carboxylic acids of 1-5 carbon atoms, such as, for example, formic acid, acetic acid, propionic acid and isobutyric acid.

The amount of lower carboxylic acid solvent employed is not critical. Generally, enough is employed to dissolve all of the starting 3-keto-5β-H steroid. Ordinarily, the lower carboxylic acid is the exclusive solvent employed in the reduction. However, minor amounts (less than 3% of total solvent) of other solvents, e.g., the methanol from the Raney nickel, can also be present.

The reduction of this invention is effected at elevated pressure, suitably from about 10 to 300 atmospheres, preferably about 80 to 160 atmospheres.

The temperature utilized in the process of this invention is not critical within wide limits, e.g., between 0° and 50° C. Lower temperatures result in unnecessarily long reaction times while a higher temperature tends to lead to secondary reactions.

Conveniently the reduction can be conducted at about room temperature, i.e., neither heating or cooling generally is required for the reduction of the 3-keto group to go to completion.

The starting 3-keto5β-H steroids preferably have A and B rings which, except for the 3-keto group, are unsubstituted, i.e., steroids of the general partial Formula I

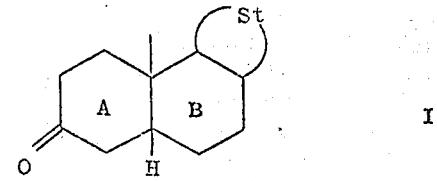

wherein St represents the residual portion of the steroid molecule. However, the process of this invention is generally applicable to 3-keto steroids and steroid precursors having A/B-rings which are in cis-linkage with each other and have a 5β-hydrogen atom.

Of special interest as starting steroids for the process of this invention are 3-keto-5β-H steroids of the general Formula II

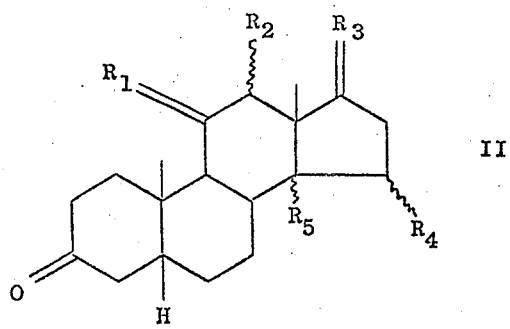

wherein $R_1$ is oxygen, two hydrogen atoms, the group or

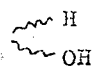

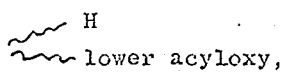

$R_2$, $R_4$ and $R_5$ each are hydrogen, hydroxy, or lower acyloxy, and $R_3$ is oxygen,

wherein $OR_6$ is hydrogen or lower acyl, or the group

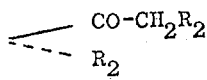

Lower acyloxy means the acyloxy group of an acid of 1-5 carbon atoms, e.g., formic acid, acetic acid, propionic acid, and isobutyric acid.

The steroids employed as the starting material can, in addition to the optionally present free or esterified hydroxy groups in the 11-, 12-, 14-, 15-, 17- or 21- position indicated in the general formula, also contain hydroxy groups in the 16- or 19-position, and methyl groups in the 1-, 6-, 7-, 16- and/or 18-positions.

The 3$\beta$-hydroxy-5$\beta$-H compounds obtainable according to the present invention can be used as intermediates for the preparation of valuable medicinal agents. In particular, they are suitable intermediates for the production of cardenolides or bufadienolides, the aglycons of which are primarily 3$\beta$-hydroxy-5$\beta$-H steroids [Can. J. Chem., 46,733 (1968); J. Org. Chem., 36, 3207 (1971)].

Numerous processes are known for the synthesis of physiologically active steroids which require the temporary reduction of a 3-keto group to a 3-hydroxy group as part of the synthetic scheme.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

3.2 g. of 5$\beta$-pregnane-3,20-dione is dissolved in 80 ml. of glacial acetic acid; the solution is charged into a tumbler autoclave having a capacity of 150 ml.; after adding 8 g. of Raney nickel, the reaction solution is shaken under a hydrogen pressure of 160–180 atmospheres. The hydrogen absorption is terminated after 1 hour at room temperature. The catalyst is filtered off, washed with methanol, and the filtrate stirred into ice water. The thus-precipitated reaction product is filtered, washed with water, and dried. The crude product (3.4 g.) is chromatographed on 200 g. of silica gel. By gradient elution with hexane/30% acetone-hexane 3$\beta$-hydroxy-5$\beta$-pregnan-20-one is separated and recrystallized from isopropyl ether.

Melting point 142°–143° C.; yield 85%.

The Raney nickel catalyst is produced as follows:

Five hundred forty g. of sodium hydroxide is dissolved in 2280 ml. of water and cooled in an ice bath of 10° C. Within 1.5 hours, 420 g. of a pulverized nickel-aluminum alloy (50% Ni, 50% Al) of the Degussa company, Hanau, is introduced into this solution in incremental portions, so that the temperature does not rise above 80° C. Thereafter, the suspension is heated for another hour on a steam bath, and the supernatant sodium hydroxide solution is decanted off after allowing the catalyst to settle down. By repeated stirring with water (about 20 liters) and decanting, the catalyst is washed neutral. Thereafter, the catalyst is washed three times with methanol, and the methanol-moist suspension is stored in a refrigerator at 5° C.

EXAMPLE 2

Analogously to Example 1, the following compounds are prepared from the corresponding 5$\beta$-3-ketones:

3$\beta$,21-dihydroxy-5$\beta$-pregnan-20-one, m.p. 140°–141° C., yield 80%;

3$\beta$-hydroxy-21-acetoxy-5$\beta$-pregnan-20-one, m.p. 136°–138°C., yield 85%;

3,17$\alpha$-dihydroxy-21-acetoxy-5$\beta$-pregnan-20-one, m.p. 219°–220° C., yield 60%;

3$\beta$-hydroxy-17$\beta$-acetoxy-5$\beta$-androstane, m.p. 140°–142°C., yield 80%;

3$\beta$,14$\alpha$-dihydroxy-5$\beta$-androstan-17-one, m.p. 223°–225° C., yield 60%;

3$\beta$,11$\beta$-dihydroxy-5$\beta$-androstan-17-one, m.p. 259°–263° C., yield 70%;

3$\beta$, 17$\alpha$,21-trihydroxy-5$\beta$-pregnan-20-one, m.p. 223°–234° C., yield 60%;

3$\beta$,11$\beta$,17$\alpha$,21-tetrahydroxy-5$\beta$-pregnan-20-one, m.p. 136°–138° C., yield 80%;

3$\beta$,12$\beta$,15$\alpha$-trihydroxy-5$\beta$-pregnan-20-one, m.p. 208°–210° C., yeild 85%;

3$\beta$-hydroxy-21-acetoxy-5$\beta$-pregnane-11,20-dione, m.p. 180°–181° C., yield 75%.

EXAMPLE 3

One gram of 12$\beta$,15$\alpha$-dihydroxy-5$\beta$-pregnane-3,20-dione is hydrogenated in 40 ml. of propionic acid with 10 g. of Raney nickel catalyst at a hydrogen pressure of 120–140 atmospheres. After working up the reaction solution as described in Example 1 and recrystallizing the crude product from methylene chloride/hexane, the thus-obtained 3$\beta$,12$\beta$,15$\alpha$-trihydroxy-5$\beta$-pregnan-20-one melts at 208°–210° C. Yield 85% of theory.

EXAMPLE 4

One gram of 5$\beta$-pregnane-3,20-dione is dissolved in 30 ml. of formic acid and hydrogenated analogously to Example 1 with 5 g. of Raney nickel catalyst under a hydrogen pressure of 90–110 atmospheres. After working up the reaction mixture analogously to Example 1 and recrystallization from isopropyl ether, 3$\beta$-hydroxy-5$\beta$-pregnan-20-one is obtained (81%) having a melting point of 141°–142° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the reduction of 3-keto-5β-H steroids to 3-hydroxy-5β-H steroids the improvement which comprises reducing a 3-keto-5β-H steroid having an angular methyl group at the 10— position and otherwise unsubstituted A and B rings in cis-linkage with each other substantially entirely to a 3β-hydroxy-5β-H steroid by conducting the reduction in a lower carboxylic acid with Raney nickel and hydrogen under pressure.

2. A process according to claim 1 wherein the lower carboxylic acid is glacial acetic acid.

3. A process according to claim 1, wherein the pressure is about 10 to 300 atmospheres.

4. A process according to claim 1, wherein the starting 3-keto-5β-H steroid is a compound of the formula

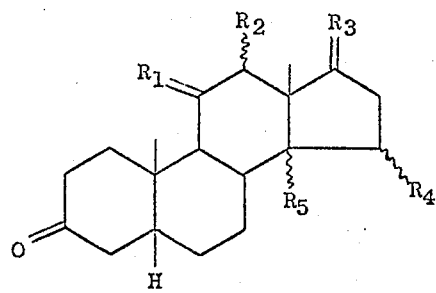

wherein $R_1$ is oxygen, two hydrogen atoms,

or

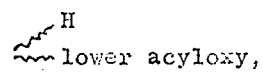

$R_2$, $R_4$ and $R_5$ each are a hydrogen atom, hydroxy or lower acyloxy and $R_3$ is oxygen,

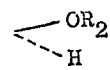

or

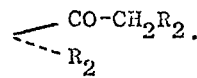

5. A process according to claim 4, wherein the lower carboxylic acid is glacial acetic acid.

6. A process according to claim 4, wherein the pressure is about 10 to 300 atmospheres.

* * * * *

UNITED STATES PATENT OFFICE
CERTIFICATE OF CORRECTION

PATENT NO. : 3,875,195
DATED : April 1, 1975
INVENTOR(S) : Robert C. Nickolson et al It is certified that error appears in the above-identified patent and that said Letters Patent are hereby corrected as shown below:

Title Page, change Inventors to read --Robert C. Nickolson, Ulrich Kerb, Rudolf Wiechert, all of Berlin, Germany--.

Column 3, line 16, change "OR$_6$" to --R$_6$--.

Column 6, lines 16-20, change to read $$\begin{matrix} & \diagup OR_6 \\ -- & \\ & \diagdown H \end{matrix}$$

wherein R$_6$ is hydrogen or lower acyl, or --

Signed and Sealed this nineteenth Day of August 1975

[SEAL]

Attest:

RUTH C. MASON
Attesting Officer

C. MARSHALL DANN
Commissioner of Patents and Trademarks